(12) United States Patent
Fu et al.

(10) Patent No.: US 10,942,143 B2
(45) Date of Patent: Mar. 9, 2021

(54) BIOSENSOR ELECTRODE AND BIOSENSOR USING THE SAME

(71) Applicants: Tsinghua University, Beijing (CN); HON HAI PRECISION INDUSTRY CO., LTD., New Taipei (TW)

(72) Inventors: Hong-Ying Fu, Beijing (CN); Wen-Zhen Li, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 26 days.

(21) Appl. No.: 15/798,795

(22) Filed: Oct. 31, 2017

(65) Prior Publication Data

US 2018/0356361 A1    Dec. 13, 2018

(30) Foreign Application Priority Data

Jun. 9, 2017   (CN) .......................... 201710434460.9

(51) Int. Cl.
*G01N 27/327* (2006.01)
*G01N 27/30* (2006.01)

(52) U.S. Cl.
CPC ......... *G01N 27/327* (2013.01); *G01N 27/308* (2013.01)

(58) Field of Classification Search
CPC ...... G01N 27/327; G01N 27/26; G01N 27/30; G01N 27/308; F01N 2570/12
See application file for complete search history.

(56) References Cited

U.S. PATENT DOCUMENTS

| | | | |
|---|---|---|---|
| 2006/0073089 A1* | 4/2006 | Ajayan | B01D 71/021 423/447.2 |
| 2006/0273005 A1 | 12/2006 | Love et al. | |
| 2011/0171559 A1 | 7/2011 | Zhang et al. | |
| 2012/0214172 A1* | 8/2012 | Chen | B82Y 15/00 435/6.19 |
| 2014/0186256 A1* | 7/2014 | Wu | C23C 14/0605 423/447.3 |
| 2015/0099062 A1 | 4/2015 | Tseng et al. | |
| 2015/0253277 A1 | 9/2015 | Wada et al. | |

(Continued)

FOREIGN PATENT DOCUMENTS

| | | |
|---|---|---|
| CN | 101465434 | 6/2009 |
| CN | 102690968 | 9/2012 |
| CN | 102709569 | 10/2012 |

(Continued)

OTHER PUBLICATIONS

Christine M. Gabardo, Amin Hosseini, and Leyla Soleymani, A new wrinkle in biosensors, IEEE Nanotechnology Magazine, Jun. 2016, 6-18. (Year: 2016).*

(Continued)

*Primary Examiner* — Luan V Van
*Assistant Examiner* — Caitlyn Mingyun Sun
(74) *Attorney, Agent, or Firm* — ScienBiziP, P.C.

(57) ABSTRACT

A biosensor electrode, comprising: a porous metal structure; and a carbon nanotube structure comprising a plurality of carbon nanotubes, the carbon nanotube structure is fixed on a surface of the porous metal structure, wherein the porous metal structure and the carbon nanotube structure are shrunk together to form a plurality of wrinkled parts.

1 Claim, 12 Drawing Sheets

(56) References Cited

U.S. PATENT DOCUMENTS

2018/0183041 A1* 6/2018 Tour .................. H01M 4/667
2018/0346337 A1* 12/2018 Tour .................. B82Y 40/00

FOREIGN PATENT DOCUMENTS

| | | |
|---|---|---|
| CN | 106611627 A | 5/2017 |
| JP | 2002-523617 | 7/2002 |
| JP | 2014-198326 | 10/2014 |
| TW | 201405926 A | 2/2014 |
| TW | 201515311 A | 4/2015 |
| TW | 201704148 A | 2/2017 |
| WO | 2015179320 | 11/2015 |
| WO | 2016/152645 | 9/2016 |

OTHER PUBLICATIONS

Robert C. Adams-McGavin, Yuting Chan, Christine M. Gabardo, et al., Nanoporous and wrinkled electyrodes enhance the sensitivity of glucose biosensors, Electrochimica Acta, 242 (2017), 1-9. (Year: 2017).*

Jonathan D. Pegan, Adrienne Y. Ho, Mark Bachman, et al., Flexible shrink-induced high surface area electrodes for electrochemiluminescent sensing, RSC Publishing, Lab on a Chip, 2013, 13, 4205-4209. (Year: 2013).*

J. Ding, et al., Assembly of carbon nanotubes on a nanoporous gold electrode for acetylcholinesterase biosensor design, 199 Sensors and Actuators B: Chemical 2014, p. 284-290. (Year: 2014).*

E. Schroder and P. Hyldgaard, van der Waals Interactions of Parallel and Concentric nanotubes Applied Physics Report 2003-25, p. 1-6. (Year: 2003).*

C.M. Gabardo et al., A New Wrinkle in Biosensors, IEEE Nanotechnology Magazine, Jun. 2016, p. 6-18. (Year: 2016).*

Jiawang Ding et al., Assembly of carbon nanotubes on a nanoporous gold eletrode for acetylcholinesterase biosensor design, Sensors and Actuators B, Apr. 18, 2014, 284-290, vol. 199.

Elsebeth Schroder et al., Van der Waals interactions of parallel and concentric nanotubes, Material science and engineering c, Dec. 31, 2003, 721-725, vol. 23.

* cited by examiner

BIOSENSOR ELECTRODE AND BIOSENSOR USING THE SAME

CROSS-REFERENCE TO RELATED APPLICATIONS

This application claims all benefits accruing under 35 U.S.C. § 119 from China Patent Application No. 201710434460.9, filed on Jun. 9, 2017 in the China Intellectual Property Office, disclosure of which is incorporated herein by reference. The application is also related to copending U.S. applications entitled, "METHOD FOR MAKING COMPOSITE STRUCTURE WITH POROUS METAL", filed Oct. 31, 2017 (Ser. No. 15/798,756); "COMPOSITE STRUCTURE WITH POROUS METAL", filed Oct. 31, 2017 (Ser. No. 15/798,730); and "FUEL CELL ELECTRODE AND FUEL CELL USING THE SAME", field Oct. 31, 2017 (Ser. No. 15/798,769).

BACKGROUND

1. Technical Field

The present disclosure relates to a biosensor electrode and a biosensor using the same.

2. Description of Related Art

Biosensors have high sensitivity, good reliability, rapid response, good selectivity and low cost, therefore the biosensors are used to detect the weight concentration of biomolecules. The biosensor includes a molecular recognition element and a signal conversion element. The molecular recognition element is configured to identify a biochemical reaction signal and the signal conversion element is configured to convert the biochemical reaction signal into an electrical signal.

The molecular recognition element in the biosensor includes an electrode and a material having catalytic properties. The material having catalytic properties are generally combined with the electrode by bonding or physical contact. The electrode is used to collect the current generated by the biochemical reaction. The material having an catalytic activity is reacted with a biomolecule to be measured for catalytic use.

In general, because the nanoporous metal structure has a large specific surface area, which can achieve higher sensitivity and lower detection limits, so the nanoporous metal structure is used for the electrode. However, referring to FIG. 1, when the nanoporous metal is shrunk, a plurality of ligaments in the nanoporous metal is easy to break. Therefore, a conductivity of the wrinkled nanoporous metal is low, and strength of the nanoporous metal is poor, which reduce the service life of the biosensor electrode and the biosensor using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
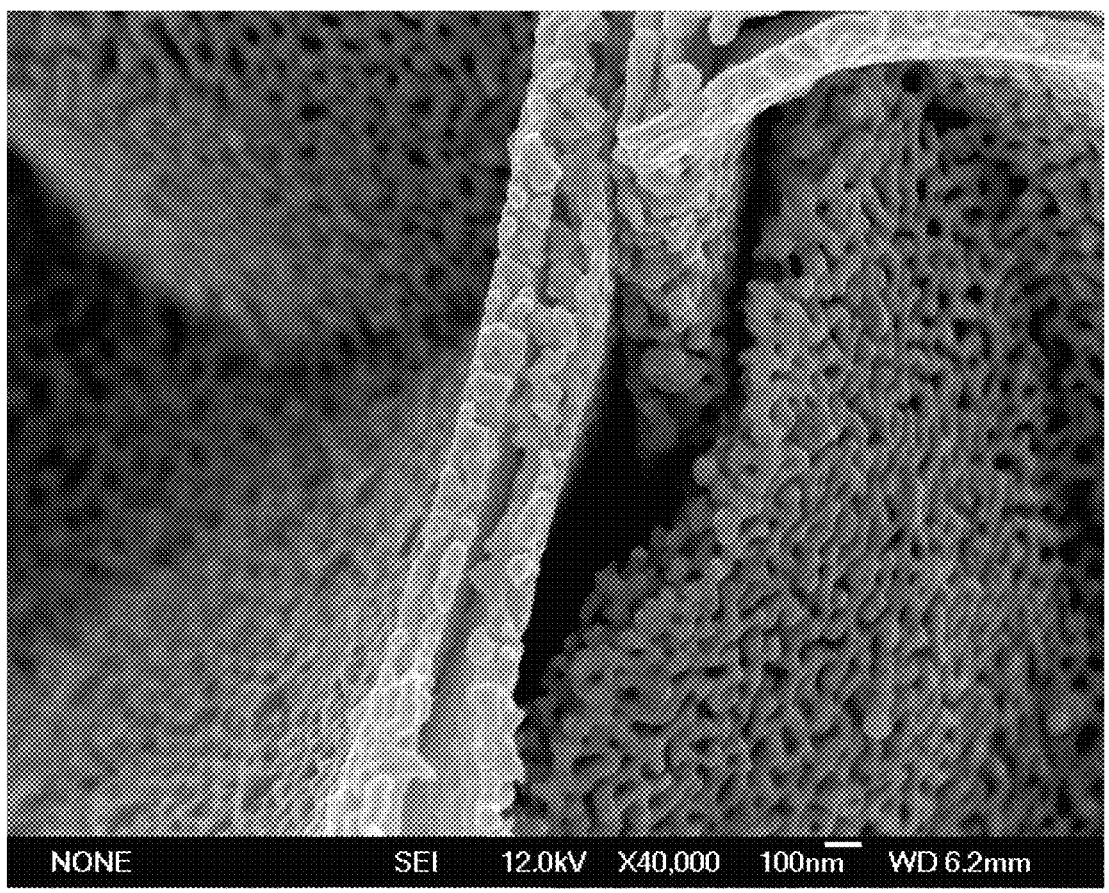
FIG. 1 is a Scanning Electron Microscope (SEM) image of the conventional wrinkled nanoporous gold film at a high magnification.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like. It should be noted that references to "one" embodiment in this disclosure are not necessarily to the same embodiment, and such references mean at least one.

A biosensor electrode according to one exemplary embodiment is provided. The biosensor electrode includes a composite structure with porous metal. The composite structure with porous metal includes a porous metal structure and a carbon nanotube structure fixed on a surface of the porous metal structure.

The carbon nanotube structure not only has high mechanical strength, high toughness and preferred conductivity, but the porous metal structure and the carbon nanotube structure also have catalytic characteristics. Therefore, the biosensor electrode can collect electrons and catalyze.

Figure 2:
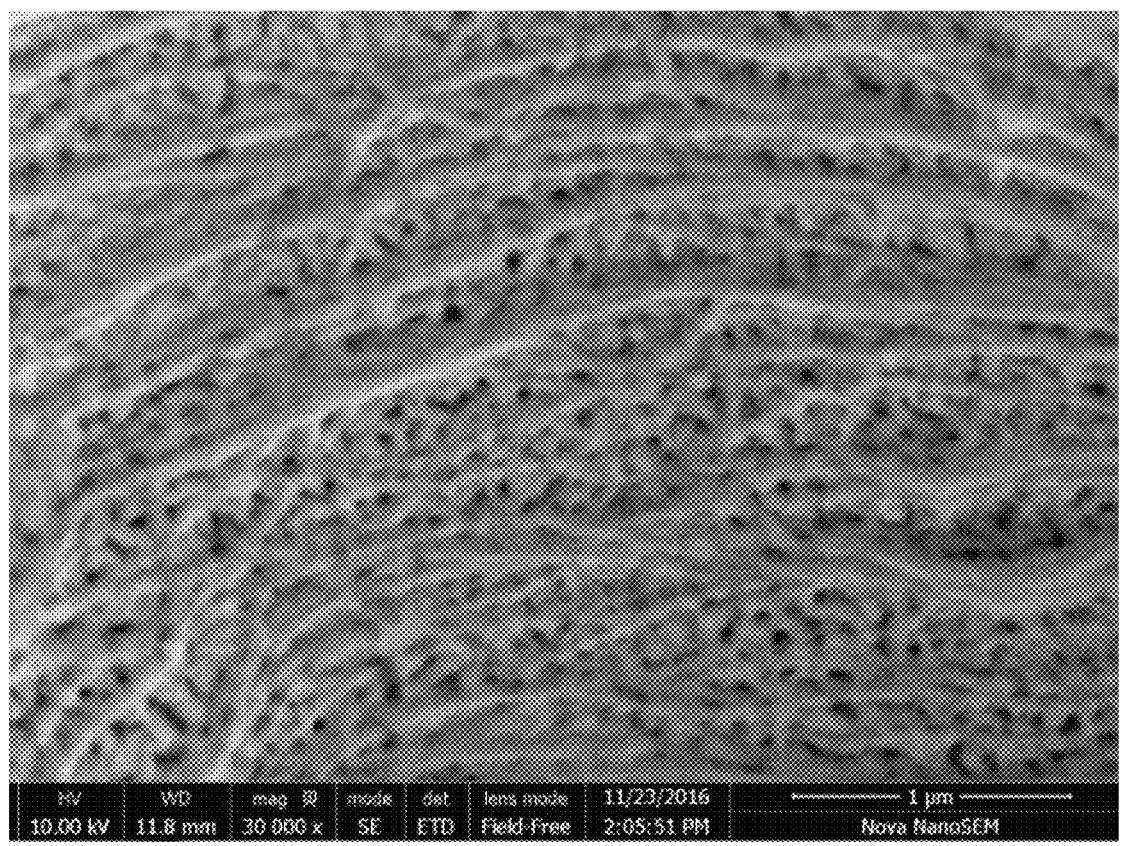
FIG. 2 is a Scanning Electron Microscope (SEM) image of one exemplary embodiment of $MnO_2$ material formed on a composite structure with porous metal at a low magnification.

Referring to FIG. 2, the biosensor electrode can further include a material with catalytic property. The material with catalytic property can be grown directly on the composite structure with porous metal. The material with catalytic property can be further located in micropores between the adjacent carbon nanotubes in the carbon nanotube structure and a plurality of ligaments of the porous metal structure. Any additives need not be introduced to between the catalytic material and the porous metal structure, which reduces the internal resistance of the biosensor electrode and improves the conductivity of the biosensor electrode.

The material with catalytic property can be nano-oxides or metal particles, which can further improve catalytic property of the biosensor electrode. The nano-oxides can be $Co_3O_4$ or $MnO_2$. The biosensor electrode can be used as an anode or a cathode. In one exemplary embodiment, the porous metal composite structure is placed in an aqueous solution containing $KMnO_4$ compounds and hydrazine hydrate compounds. The $KMnO_4$ compounds is reduced to form $MnO_2$ particles. The $MnO_2$ particles are formed on the surface of the carbon nanotube structure, and the micropores between the adjacent carbon nanotubes and the ligament of the porous metal structure.

Figure 3:
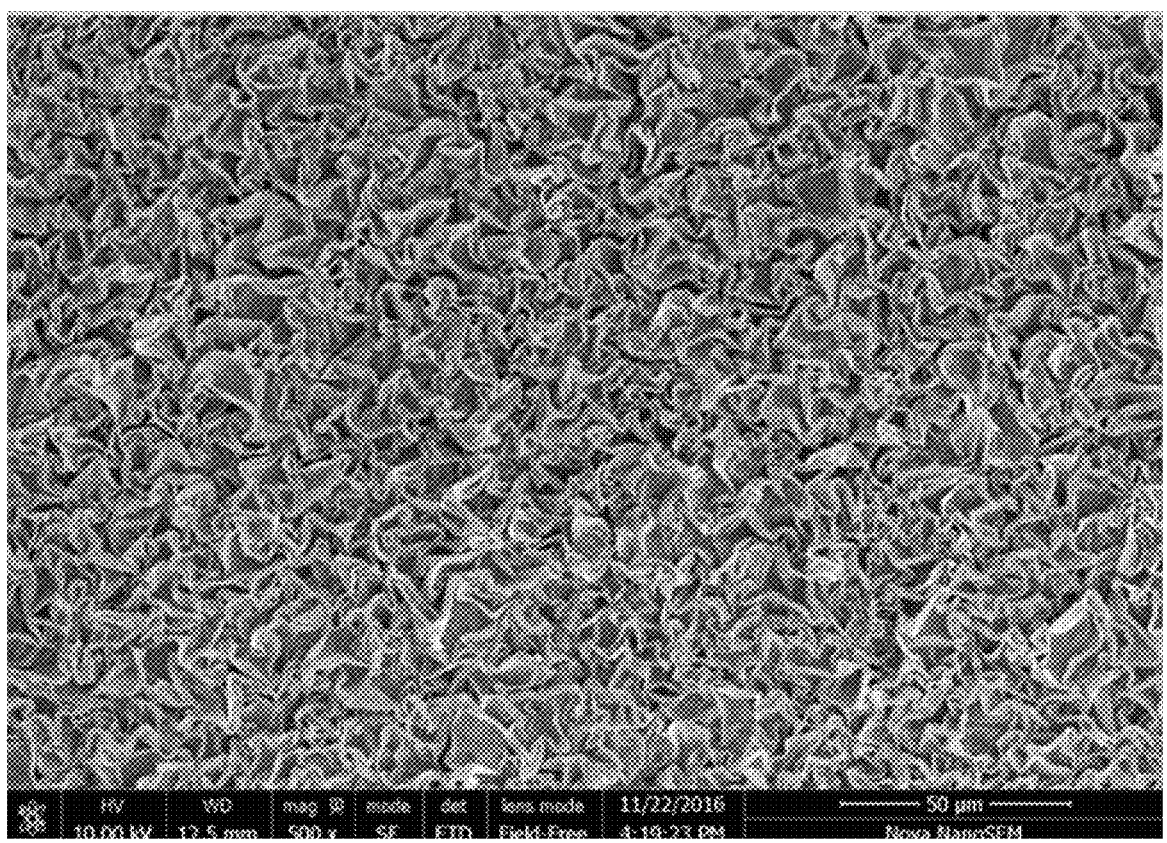
FIG. 3 is a Scanning Electron Microscope (SEM) image of one exemplary embodiment of the composite structure with porous metal at a low magnification.
Figure 4:
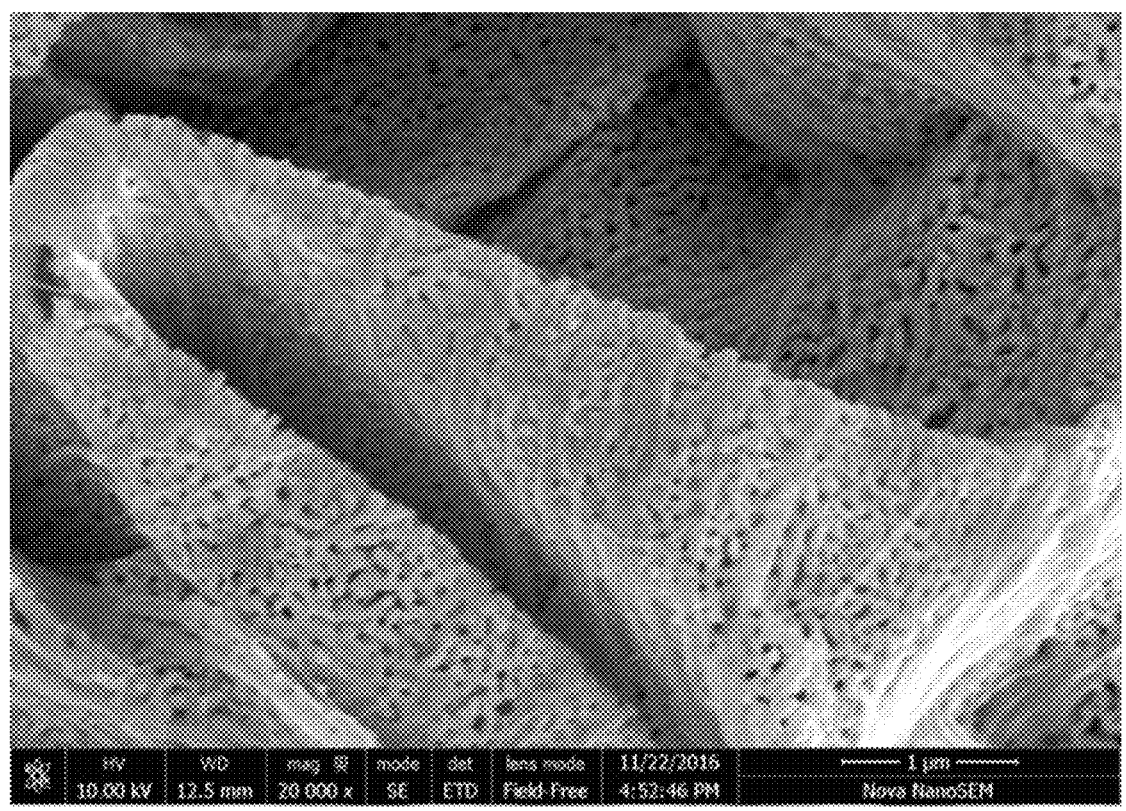
FIG. 4 is a Scanning Electron Microscope (SEM) image of the composite structure with porous metal at a high magnification.

Referring FIG. 3 and FIG. 4, a composite structure with porous metal according to one exemplary embodiment is provided. The composite structure with porous metal includes a porous metal structure and a carbon nanotube structure fixed on a surface of the porous metal structure. The carbon nanotube structure includes a plurality of carbon nanotubes. The carbon nanotube structure and the porous metal structure are shrunk together to form a plurality of wrinkled parts.

Shape of the porous metal structure is not limited, such as, film shape and nanosheets. The porous metal structure is a three-dimensional network. The porous metal structure includes a plurality of ligaments. Materials of the ligament can be selected from silver (Ag), platinum (Pt) and gold (Au). The plurality of ligaments define a plurality of pores. Each of the plurality of pores is formed by adjacent ligaments. The plurality of pores can be regularly distributed or irregularly distributed. The plurality of pores is at a nano-level. In one exemplary embodiment, size of the pores is less than 1000 nm.

Figure 5:
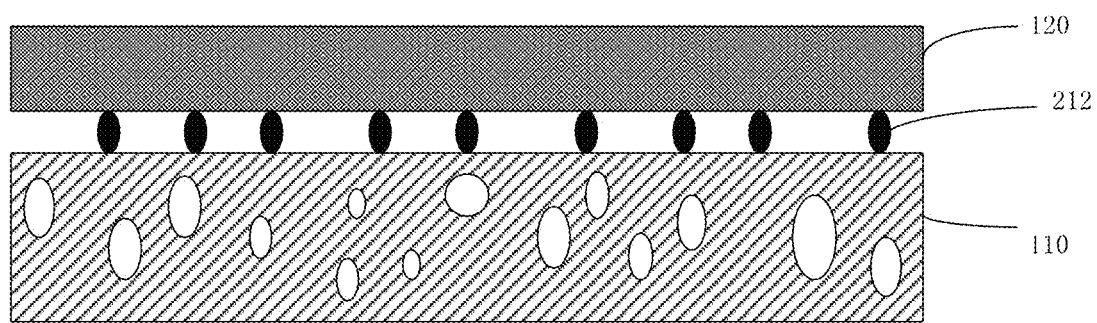
FIG. 5 shows a schematic drawing of a bonding material for fixing a carbon nanotube structure on surface of a porous metal structure.

The carbon nanotube structure 120 is fixed on the surface of the porous metal structure 110 by a bonding material 212 as shown in FIG. 5. The carbon nanotubes in the carbon nanotube structure 120 are in contact with the ligaments in the porous metal structure 110 to define a plurality of contacting surfaces. The bonding material 212 is located around the plurality of contacting surfaces. In one exemplary embodiment, the contacting surfaces are wrapped by the bonding material 212.

The carbon nanotube structure 120 can include at least one carbon nanotube wire or at least one carbon nanotube film. The carbon nanotube wire can be an untwisted carbon nanotube wire or a twisted carbon nanotube wire. The carbon nanotube film can be a drawn carbon nanotube film, a pressed carbon nanotube film, or a flocculated carbon nanotube film.

The bonding material 212 can be an organic binder material or a metal material. The organic binder material has high bonding strength, such as naphthol. The metal material can be a material selected from a group consisting of copper (Cu), silver (Ag), gold (Au), and a combination thereof. In one exemplary embodiment, the metal material is the same as the material of the porous metal structure, which can reduce contact resistance between the carbon nanotube structure 120 and the porous metal structure 110.

Figure 6:
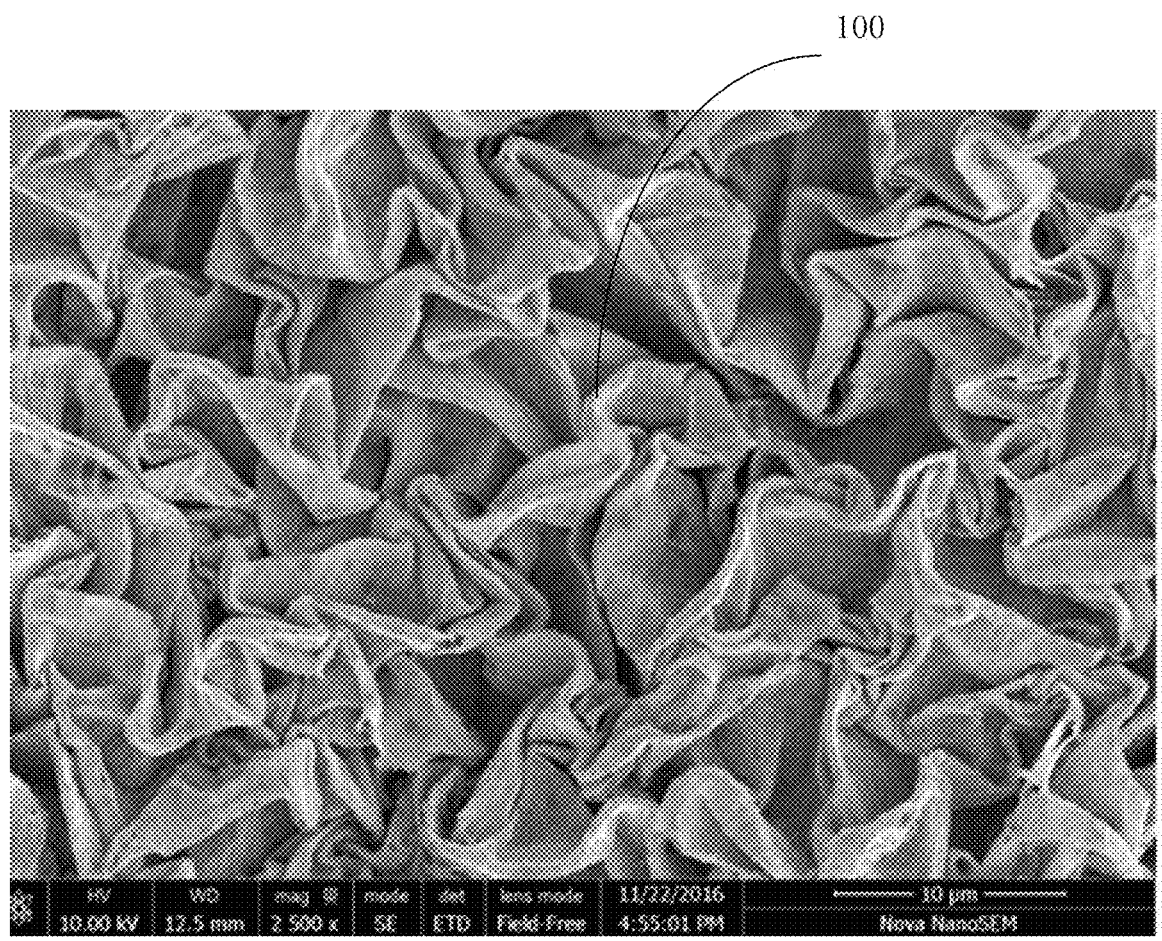
FIG. 6 is a Scanning Electron Microscope (SEM) image of the composite structure with porous metal.
Figure 7:
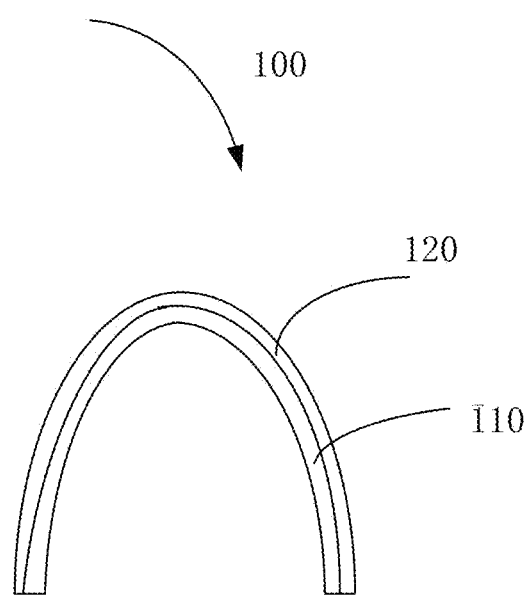
FIG. 7 is a schematic drawing of a wrinkled part of the composite structure with porous metal in FIG. 6.

Referring FIG. 6 and FIG. 7, the plurality of wrinkled parts 100 are connected to each other to form a continuous wave-shaped structure. The plurality of wrinkled parts 100 are formed by shrinking the porous metal structure 110 and shrinking the carbon nanotube structure 120 as shown in FIG. 6. The plurality of carbon nanotubes in the carbon nanotube structure 120 at the wrinkled part 100 are extended substantially along a same direction. The plurality of carbon nanotubes are joined end-to-end by van der Waals force therebetween.

The plurality of wrinkled parts 100 are irreversible distortions. Because of high toughness of the plurality of carbon nanotubes, the plurality of carbon nanotubes are fixed on the wrinkled parts to reinforce toughness of the wrinkled parts. Therefore, the composite structure with porous metal has high toughness and the composite structure with porous metal is a free-standing structure.

Figure 8:
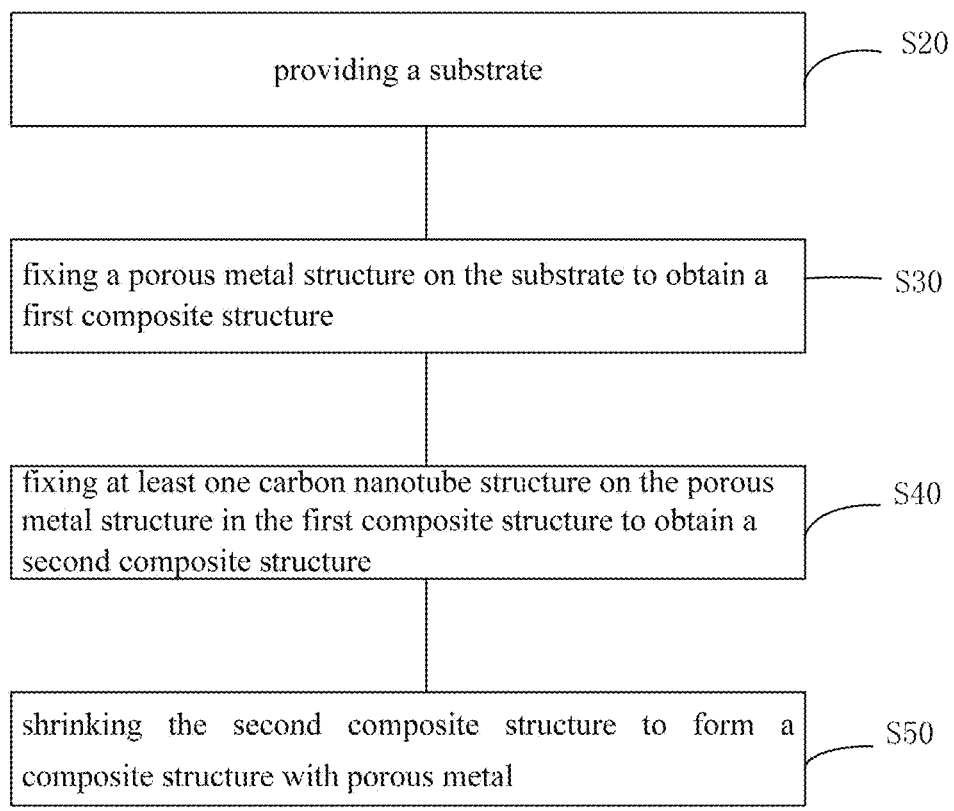
FIG. 8 is a flow chart of another exemplary embodiment a method for making the composite structure with porous metal.

Referring FIG. 8, one exemplary embodiment of a method for making the composite structure with porous metal includes the following steps:

S20, providing a substrate;

S30, fixing a porous metal structure on the substrate to obtain a first middle structure;

S40, fixing at least one carbon nanotube structure on the porous metal structure in the first middle structure to obtain a second middle structure; and S50, shrinking the second middle structure to form a composite structure with porous metal.

In step S20, the substrate can be made of a material that can be shrunk by heat, such as, plastic. The plastic includes polystyrene, polypropylene and polyparaphenylene glycol ethylene glycol.

In step S30, a method for fixing a porous metal structure on the substrate to obtain a first middle structure is not limited. In one exemplary embodiment, the substrate in the first middle structure is heated at a temperature of 80° C. for 30 minutes to 60 minutes, which the substrate is melted to adhere the porous metal structure. In another embodiment, a metal material can be grown between the substrate and the porous metal structure to fix the porous metal structure on the substrate.

A method for growing metal material between the substrate and the porous metal structure to fix the porous metal structure includes: transferring the first middle structure into a metal ion solution; and adding a reducing agent to the metal ion solution to form metal atoms. The metal atoms are deposited around contacting surfaces of the substrate and ligaments, so that the porous metal structure is fixed on the substrate.

Figure 10:
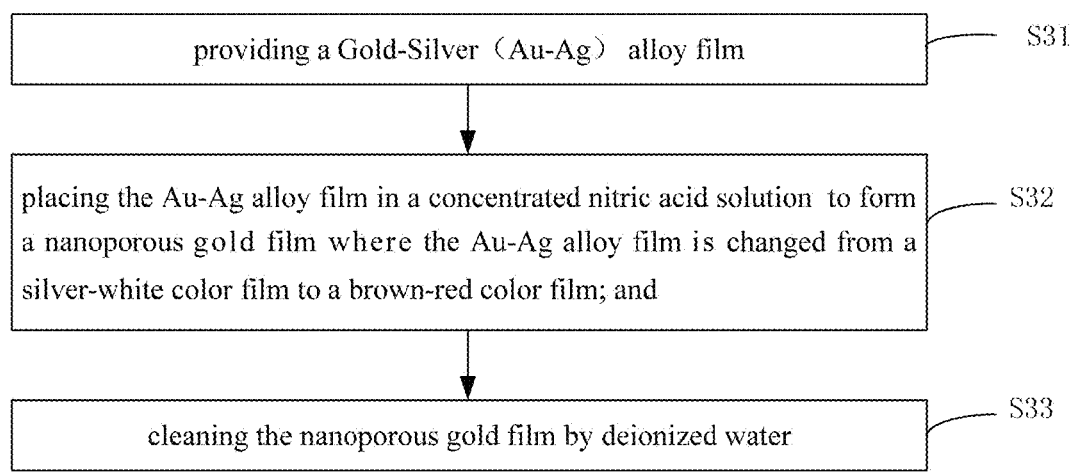
FIG. 10 is a flow chart of a method for making the nanoporous gold film in FIG. 9.

A method for obtaining the porous metal structure is not limited. In one exemplary embodiment, the porous metal structure is made of gold. A nanoporous gold film is made by chemical etching. Referring to FIG. 10, the method for making the nanoporous gold film includes the following sub-steps:

S31, providing a Gold-Silver (Au—Ag) alloy film;

S32, placing the Au—Ag alloy film in a concentrated nitric acid solution to form a nanoporous gold film where the Au—Ag alloy film is changed from a silver-white color to a brown-red color film; and S33, cleaning the nanoporous gold film by deionized water.

In step S31, the Au—Ag alloy film has a smooth surface with silver-white luster. A thickness of the Au—Ag alloy film can be ranged from 50 nm to 200 nm. Size of the Au—Ag alloy film is not limited. In one exemplary embodiment, the thickness of the Au—Ag alloy film is 100 nm. The percentage of gold atoms is about 35% and the percentage of silver atoms is about 65% in the Au—Ag alloy film.

In step S32, a weight concentration of the concentrated nitric acid solution can be ranged from 50% to 80%. The Au—Ag alloy film is transferred to the concentrated nitric acid solution by electrostatic adsorption of a glass sheet. Silver atoms in the Au—Ag alloy film react with the concentrated nitric acid solution until silver is completely depleted. When silver no longer exist, the Au—Ag alloy film becomes a brown-red color film and a plurality of pores are formed in the Au—Ag alloy film simultaneously. In one exemplary embodiment, the weight concentration of the concentrated nitric acid solution is 70%.

Figure 9:
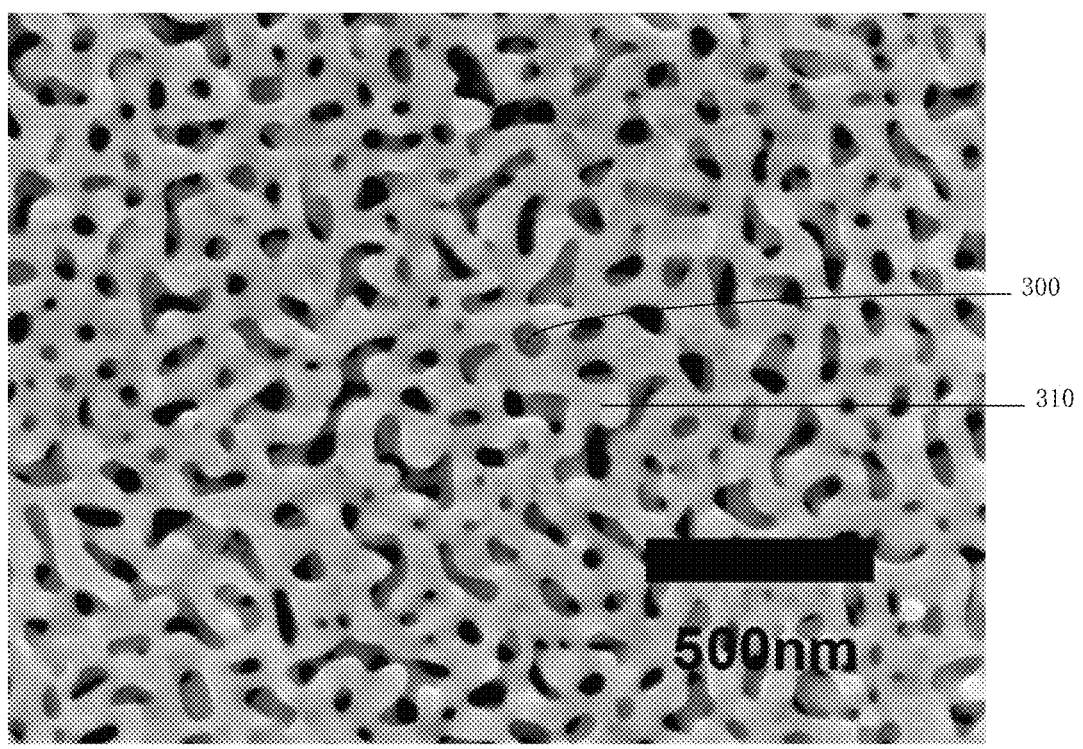
FIG. 9 is a Scanning Electron Microscope Characterization Chart of a nanoporous gold film for making the composite structure with porous metal.

Referring FIG. 9, a plurality of pores 300 are formed in the nanoporous gold film. The nanoporous gold film includes a plurality of ligaments 310. The plurality of ligaments 310 are configured to connect with adjacent pores. Size of the pores and size of the ligaments 310 are determined by the amount of time to etch the Au—Ag alloy film and the weight concentration of the concentrated nitric acid solution.

In step S33, the deionized water is configured to clean the remaining nitric acid.

Figure 11:
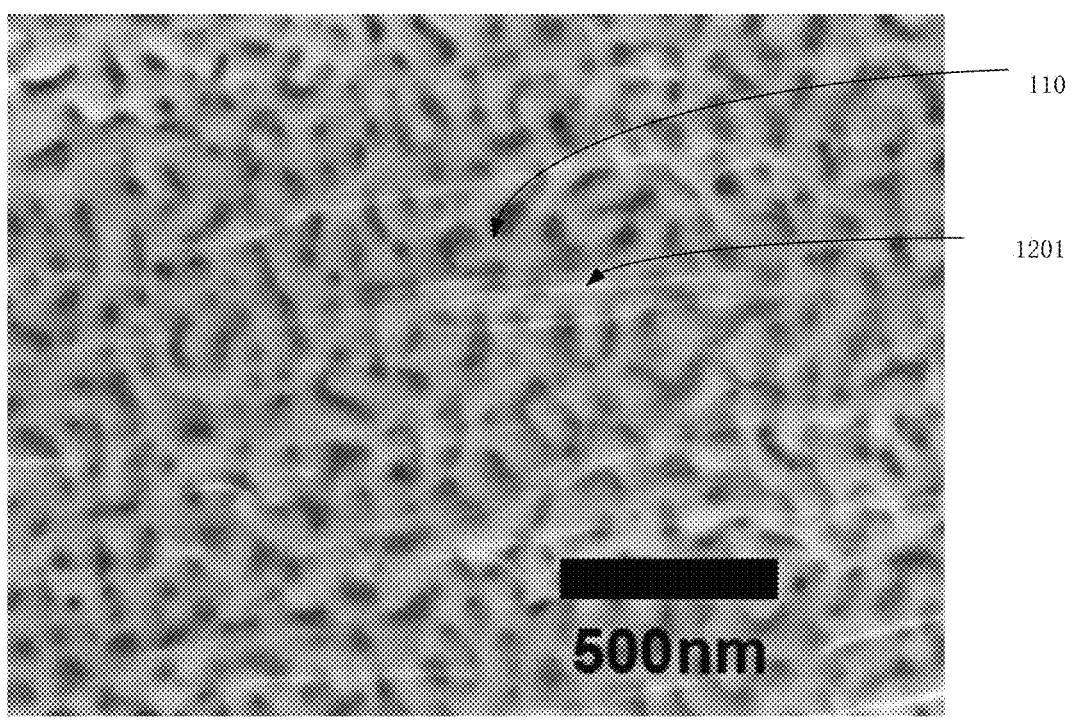
FIG. 11 is a Scanning Electron Microscope Characterization Chart of a second middle structure formed in the method for making the composite structure with porous metal.
Figure 12:
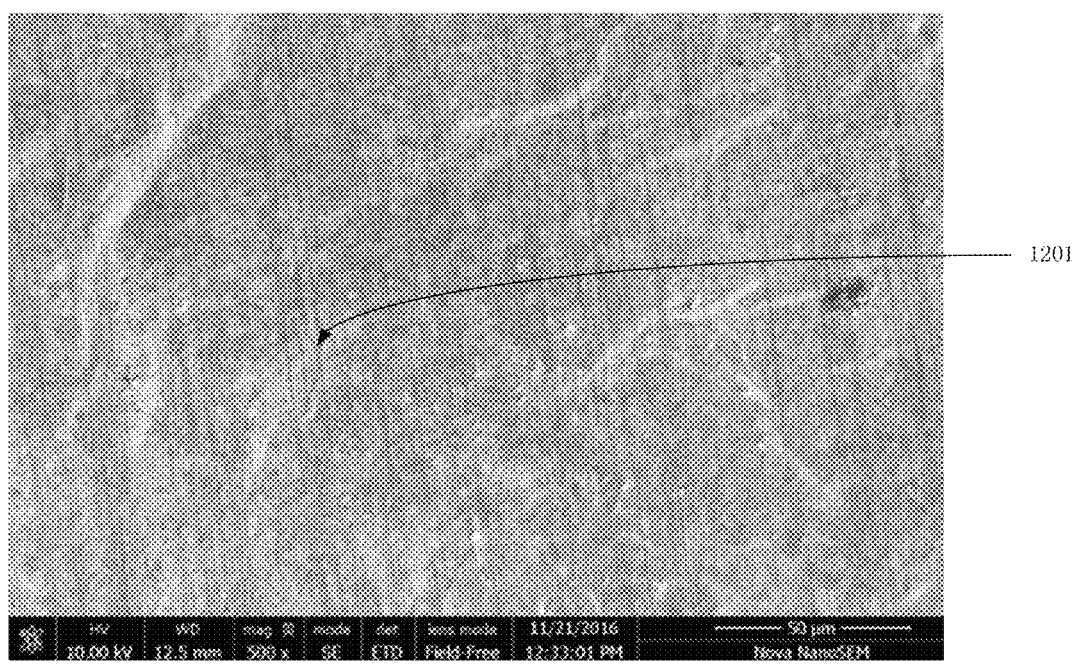
FIG. 12 is a Scanning Electron Microscope (SEM) of the second middle structure formed in the method of making the composite structure with porous metal.

In step S40, referring FIG. 11 and FIG. 12, the at least one carbon nanotube structure is laid on the porous metal structure. When the at least one carbon nanotube structure includes a plurality of carbon nanotube structures, the plurality of carbon nanotube structures can be coplanar and/or stacked. The carbon nanotube structure can be linear shaped or planar shaped.

The carbon nanotube structure can include at least one carbon nanotube wire structure. The carbon nanotube wire structure includes at least one carbon nanotube wire 1201. When the carbon nanotube wire structure includes a plurality of carbon nanotube wires 1201, the carbon nanotube wires 1201 can be substantially parallel to each other to form a bundle-like structure, crossed with each other to form a network structure or twisted with each other to form a twisted structure. The carbon nanotube wire 1201 itself can be untwisted or twisted.

The carbon nanotube structure can include at least one carbon nanotube film. When the carbon nanotube structure includes a plurality of carbon nanotube films, the plurality of carbon nanotube films can be coplanar and/or stacked. If the plurality of carbon nanotube films are stacked, an angle between adjacent carbon nanotubes in the stacked carbon nanotube films can be ranged from 0° to 90°.

The carbon nanotube film includes a plurality of carbon nanotubes bonded by van der Waals force therebetween. The carbon nanotubes in the carbon nanotube film can be orderly or disorderly arranged. The term "disordered carbon nanotube structure" refers to a structure where the carbon nanotubes are arranged along different directions, and the alignment directions of the carbon nanotubes are random. The number of the carbon nanotubes arranged along each different direction can be almost the same (e.g. uniformly disordered). The carbon nanotube film has properties identical in all directions of the carbon nanotube film. The carbon nanotubes in the disordered carbon nanotube structure can be entangled with each other.

The term "ordered carbon nanotube structure" refers to a structure where the carbon nanotubes are arranged in a consistently systematic manner, e.g., the carbon nanotubes are arranged approximately along a same direction. The carbon nanotube film can be a drawn carbon nanotube film, a pressed carbon nanotube film, or a flocculated carbon nanotube film. In one embodiment, the carbon nanotube structure includes a drawn carbon nanotube film, which can reduce internal resistance of the composite structure with porous metal, and improve conductivity thereof.

There are two methods to fix the at least one carbon nanotube structure on the porous metal structure:

dropping an organic binder material to the surface of the carbon nanotube structure in the first middle structure, wherein the organic binder material enters the porous metal structure from micropores in the carbon nanotubes. The organic binder material encloses the contact surface between the porous metal structure and the carbon nanotube structure. The micropores can be defined by adjacent carbon nanotubes in the carbon nanotube structure; or transferring the second middle structure into a metal ion solution; adding a reducing agent to the metal ion solution to form metal atoms, the metal atoms are deposited around contacting surfaces of the porous metal structure and the carbon nanotube structure. In one embodiment, the second middle structure is transferred into a gold ion solution to form gold atoms, the gold atoms are grown directly around the contact surface of the porous gold structure and the carbon nanotube structure to enclose the contacting surfaces.

In step S50, a method for shrinking the second middle structure is not limited. In one exemplary embodiment, the second middle structure is heated at a temperature of 160° C. for 2 minutes, in which the substrate can appear wrinkled. Because the porous metal structure is fixed on the substrate and the carbon nanotube structure is fixed on the porous metal structure, the substrate drives the porous metal structure and the carbon nanotube structure to shrink together. The porous metal structure will not break in the shrinkage process.

The composite structure with porous metal provided by above embodiment has an advantage, where the carbon nanotubes are composited with the porous metal structure, and the carbon nanotubes reinforce the stability of porous metal structure. Because the carbon nanotubes have strong toughness and preferred conductivity, the composite structure with porous metal has high toughness and preferred conductivity.

A biosensor using the above biosensor electrode according to one exemplary embodiment is provided. The biosensor includes a molecular recognition element and a signal conversion element. The molecular recognition element is configured to identify biochemical reaction signal and the signal conversion element is configured to convert the biochemical reaction signal into an electrical signal.

The composite structure with porous metal is in contact with a biomolecule to be measured, wherein the biomolecule is catalyzed to produce a biochemical reaction signal. The signal conversion element converts the biochemical reaction signal into a physical signal and outputs the physical signal to a signal processing system. The signal processing system monitors the concentration of the biomolecule to be measured by treating the physical signal. The biomolecule to be measured can be a glucose molecule, an organic molecule, an enzyme, an enzyme substrate, an antibody, an antigen or any combination thereof, etc.

The molecular recognition element further includes a material with catalytic property. The material with catalytic property can be located on a surface of the composite structure with porous metal. The material with catalytic property can be nano-oxides or metal particles, which can further improve catalytic property of the molecular recognition element. The nano-oxides can be $Co_3O_4$ or $MnO_2$. Shape of the nano-oxides can be nanoparticles, nanosheets and nanometer flower.

The signal conversion element can be a physical or chemical transducer. The transducer can be selected from an oxygen electrode, a photodiode, a field effect transistor, a piezoelectric crystal, and a combination thereof. The signal conversion element converts the biochemical reaction signal into a measurable electrochemical signal to obtain the weight concentration of the biomolecule to be measured.

The biosensor electrode and biosensor using the same can have many advantages. First, the carbon nanotube structures have high mechanical strength and preferred conductivity, which extends the working life of the biosensor. Moreover, the porous metal structure and the carbon nanotube structure have preferred catalytic performance, so the biosensor can collect electrons and catalyze. Other catalytic material need not be introduced to the biosensor, and the structure of the biosensor is simple and convenient. In addition, the biosensor further includes a catalytic material, the catalytic material is formed directly on the composite structure with porous metal, which reduces the internal resistance of the biosensor electrode and the biosensor, and further improves the conductivity of the biosensor electrode and biosensor.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A biosensor electrode, comprising:
   a porous metal structure, wherein the porous metal structure is a film made of gold and comprises a plurality of pores; and
   a carbon nanotube structure comprising a plurality of carbon nanotubes joined end-to-end by van der Waals force,
   wherein the carbon nanotube structure is laid on a surface of the porous metal structure and covers the plurality of pores; the plurality of carbon nanotubes are arranged along a same direction; the plurality of carbon nanotubes are arranged on the surface of the porous metal structure; and a length direction of the plurality of carbon nanotubes crosses over the plurality of pores;
   wherein the carbon nanotube structure and the porous metal structure are two distinguishable layer structures; and the carbon nanotube structure is in direct contact with the surface of the porous metal structure; and
   wherein each of the porous metal structure and the carbon nanotube structure defines a plurality of wrinkled parts; each of the plurality of wrinkled parts comprises a carbon nanotube structure wrinkled part and a porous metal structure wrinkled part; and the carbon nanotube structure wrinkled part and the porous metal structure wrinkled part are stacked with each other.

* * * * *